(12) United States Patent
Tsukada

(10) Patent No.: US 11,190,654 B2
(45) Date of Patent: Nov. 30, 2021

(54) IMAGE PROCESSING APPARATUS THAT PREVIEWS IMAGES, CONTROL METHOD FOR IMAGE PROCESSING APPARATUS, AND STORAGE MEDIUM

(71) Applicant: CANON KABUSHIKI KAISHA, Tokyo (JP)

(72) Inventor: Yoshihiro Tsukada, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/240,995

(22) Filed: Jan. 7, 2019

(65) Prior Publication Data
US 2019/0222700 A1   Jul. 18, 2019

(30) Foreign Application Priority Data

Jan. 15, 2018 (JP) .............................. JP2018-004348

(51) Int. Cl.
*H04N 1/00* (2006.01)
*H04N 1/32* (2006.01)
*H04N 1/60* (2006.01)

(52) U.S. Cl.
CPC ....... *H04N 1/0044* (2013.01); *H04N 1/00352* (2013.01); *H04N 1/32219* (2013.01); *H04N 1/00482* (2013.01); *H04N 1/603* (2013.01); *H04N 1/6033* (2013.01)

(58) Field of Classification Search
CPC ............. H04N 1/0044; H04N 1/32219; H04N 1/00352; H04N 1/603
USPC ....................................................... 358/1.15
See application file for complete search history.

(56) References Cited

U.S. PATENT DOCUMENTS

| 7,064,858 B2 * | 6/2006 | Iwai | G06K 15/02 345/629 |
|---|---|---|---|
| 2006/0036568 A1 * | 2/2006 | Moore | G06F 16/168 |
| 2006/0238786 A1 * | 10/2006 | Sakura | G06F 3/1285 358/1.9 |
| 2011/0032373 A1 * | 2/2011 | Forutanpour | G11B 27/34 348/222.1 |
| 2012/0243017 A1 * | 9/2012 | Machida | H04N 1/00503 358/1.13 |

(Continued)

FOREIGN PATENT DOCUMENTS

| JP | 2010068196 A | 3/2010 |
| JP | 2016126657 A | 7/2016 |
| JP | 2017182181 A | 10/2017 |

OTHER PUBLICATIONS

Office Action issued in Japanese Appln. No. 2018-004348 dated Oct. 5, 2021.

*Primary Examiner* — Miya J Williams
*Assistant Examiner* — Darryl V Dottin
(74) *Attorney, Agent, or Firm* — Rossi, Kimms & McDowell LLP

(57) ABSTRACT

An image processing apparatus which is capable of preventing decrease in user convenience with respect to enlarged display of a previewed image. The image processing apparatus generates preview images based on document data. Based on completion of generation of a first preview image based on the document data, a display device is caused to display a screen through which an instruction to start generation of a second preview image based on the document data can be issued.

15 Claims, 14 Drawing Sheets

(56) References Cited

U.S. PATENT DOCUMENTS

| | | | |
|---|---|---|---|
| 2013/0181886 A1* | 7/2013 | Hill | H04N 21/4126 |
| | | | 345/2.3 |
| 2015/0278361 A1* | 10/2015 | Yoo | G06F 16/958 |
| | | | 707/722 |
| 2016/0198052 A1* | 7/2016 | Shogaki | G06F 3/04883 |
| | | | 358/1.15 |
| 2017/0013139 A1* | 1/2017 | Suzuki | G06F 3/1288 |
| 2017/0155792 A1* | 6/2017 | Mizude | H04N 1/3208 |

* cited by examiner

FIG. 8

| | 806 | 807 | 800 |
|---|---|---|---|
| ← MEDIA PRINT | | | |
| SHEET | BRIGHTNESS | NUMBER OF COPIES | NUMBER OF SELECTED FILES |
| 1 ▭ A4 | ±0 | 1 | 🗐 1 |
| (preview 811) | SCREEN: OFF<br>OFF \| RIGHT/LEFT \| UP/DOWN<br>PAGE AGGREGATION: OFF<br>OFF \| 2_1 \| 4_1<br>JPEG/TIFF DETAILED SETTINGS | | //RESET<br>MONOCHROME START<br>COLOR START<br>CHECK STATUS |

Labels: 805, 801, 802, 810, 803, 809, 804, 808, 812

IMAGE PROCESSING APPARATUS THAT PREVIEWS IMAGES, CONTROL METHOD FOR IMAGE PROCESSING APPARATUS, AND STORAGE MEDIUM

BACKGROUND OF THE INVENTION

Field of the Invention

The present invention relates to an image processing apparatus that previews images to be formed, a control method for the image processing apparatus, and a storage medium.

Description of the Related Art

Image forming apparatuses which input and output files as image data from a removable medium such as a USB memory are known. Some of these image forming apparatuses have been developed to have a preview function that enables a user to select a desired file when printing an image of a file stored in the removable media (hereafter referred to as "media printing"). This preview function is to convert each file stored in the removable media into an image that can be displayed in a predetermined size on a display screen of the image forming apparatus and display the resulting image on the display screen (hereafter referred to as "preview"). This enables the user to see an image of each file prior to media printing.

Here, files to be previewed are broadly categorized as two types. Specifically, they are categorized as image files such as JPEG and TIFF files and image-document combined files such as PDF (Portable Document Format) files. When an image of an image file is formed by a zooming process when it is to be previewed, and hence displaying it does not take much time. On the other hand, an image of an image-document combined file is formed by drawing a plurality of images and characters and also making them transparent based on a layout of the objects to be drawn. Therefore, it takes long to display an image-document combined file when previewing it, and in some cases, previewing ends in failure at some point because of a defect in a part of the file.

When an image for print output is generated, the same process is carried out as in the case where an image to be previewed is generated, and therefore, it is considered that when an image to be previewed is not successfully generated, an image for print output is not successfully generated either. For this reason, a technique has been proposed to omit files of unsuccessfully previewed images from objects to be printed (see, for example, Japanese Patent Publication (Kokai) No. 2010-68196).

Further, there has recently been developed an image forming apparatus with a preview enlarging function of enlarging an image that is previewed (hereafter referred to as "the preview image") so that details of the preview image can be seen. The preview enlarging function requires drawing memory with storage capacities varying with file types (image files and image-document combined files), and depending on files, a large amount of drawing memory may be needed. It is thus impossible to enlarge preview images of all files.

The image forming apparatus, however, receives an instruction to enlarge a preview image from a user irrespective of a file type. In this case, for a preview image that requires a large amount of drawing memory so as to be enlarged, an enlargement process is suspended, but the user has to wait until the enlargement process is suspended. Moreover, the user cannot see the preview image that has been enlarged as desired. This causes a problem that productivity of image formation decreases, resulting in user convenience being decreased as well.

SUMMARY OF THE INVENTION

The present invention provides an image processing apparatus which is capable of preventing decrease in user convenience with respect to enlarged display of a previewed image, a control method for the image processing apparatus, and a program.

Accordingly, the present invention provides an image processing apparatus that is capable of generating preview images based on document data, comprising a display device configured to display information, and at least one controller configured to function as a unit that, based on completion of generation of a first preview image based on the document data, causes the display device to display a screen through which an instruction to start generation of a second preview image based on the document data can be issued.

According to the present invention, decrease in user convenience is prevented with respect to enlarged display of a previewed image.

Further features of the present invention will become apparent from the following description of exemplary embodiments (with reference to the attached drawings).

BRIEF DESCRIPTION OF THE DRAWINGS

FIG. 8 is a view showing a media print setting screen which is displayed when a confirmation button in FIGS. 5 to 7 is depressed.

DESCRIPTION OF THE EMBODIMENTS

Embodiments of the present invention will now be described in detail with reference to the accompanying drawings. First, a description will be given of a first embodiment of the present invention.

Figure 1:
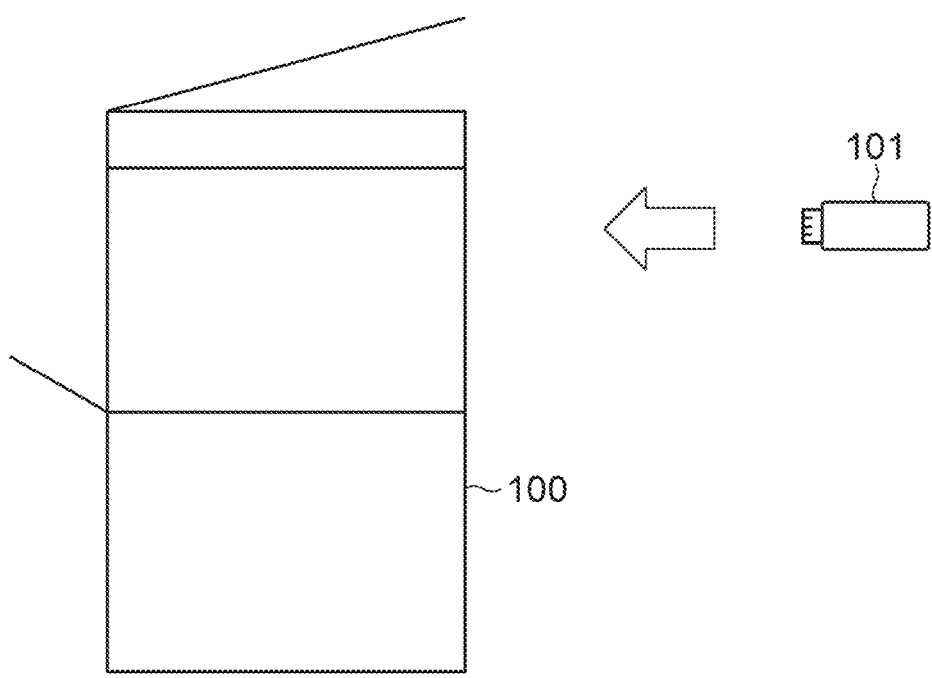
FIG. 1 is a view schematically showing an image forming system including an image forming apparatus according to a first embodiment of the present invention.

FIG. 1 is a view schematically showing an image forming system including an image forming apparatus according to a first embodiment of the present invention. Referring to FIG. 1, the image forming system has the image forming apparatus 100 (image processing apparatus) and a USB memory 101 which is a removable medium. The USB memory 101 is inserted into a slot (not shown) provided in the image forming apparatus 100 and supplies stored files (document data) to the image forming apparatus 100.

Figure 2:
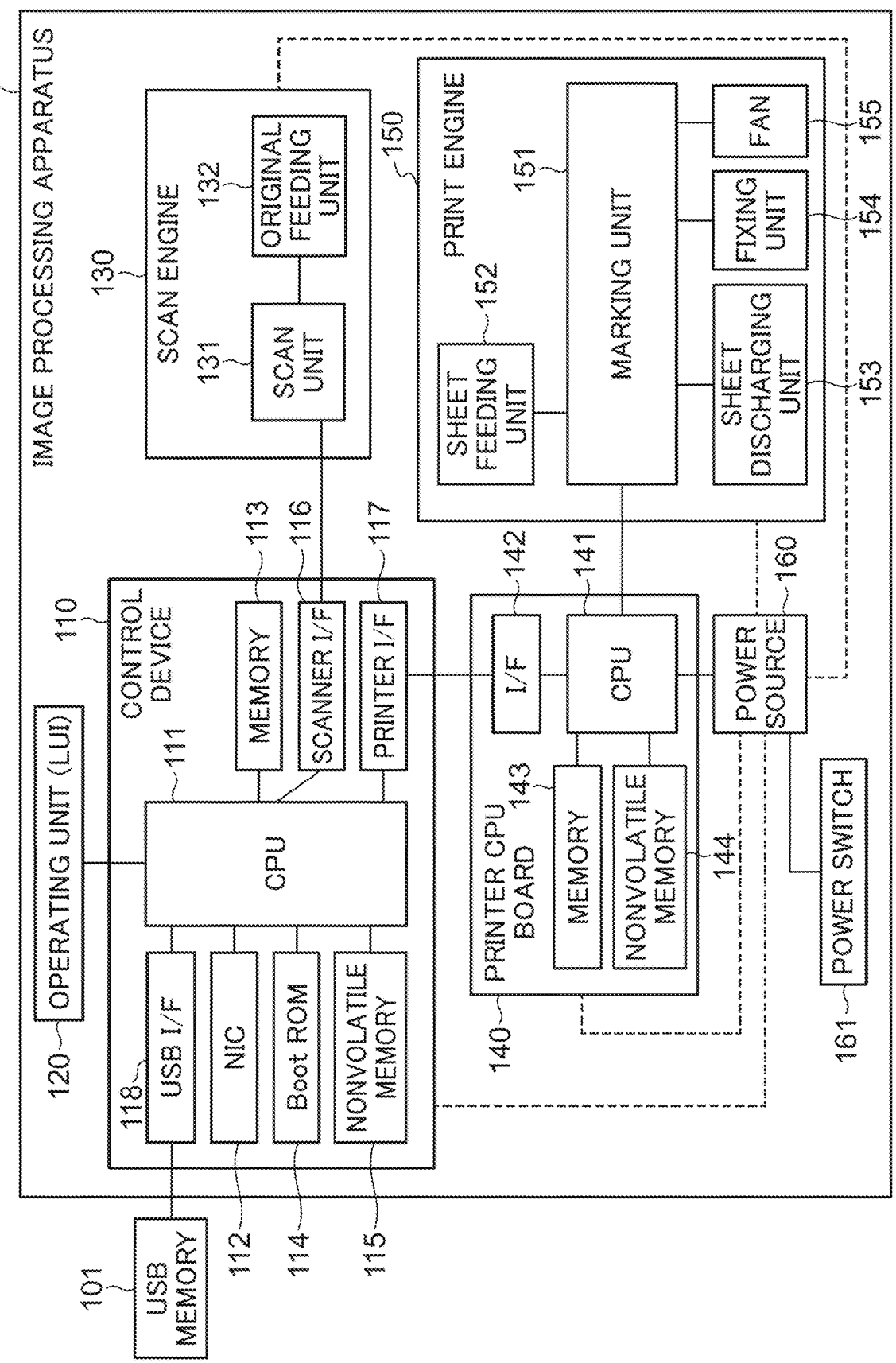
FIG. 2 is a diagram schematically showing a hardware arrangement of the image forming apparatus in FIG. 1.

FIG. 2 is a diagram schematically showing a hardware arrangement of the image forming apparatus 100 in FIG. 1. Referring to FIG. 2, the image forming apparatus 100 is a so-called multifunction printer (MFP). The image forming apparatus 100 has a control device 110, an operating unit 120, a scan engine 130, a printer CPU board 140, a print engine 150, a power source 160, and a power switch 161.

The control device 110 is connected to each of the component elements, and a controller mounted in the control device 110 executes predetermined jobs in the image forming apparatus 100. The control device 110, which is a general CPU system, has a memory 113 which is used as a work memory by the CPU 111, and a boot ROM 114 including a boot program. These component elements of the control device 110 are arranged on a CPU board. The control device 110 also has a NIC 112 for connecting to an external apparatus via a network, a USB I/F 118 which controls input and output of files to and from the USB memory 101, and a nonvolatile memory 115 which stores firmware. The nonvolatile memory 115 may be either mounted on the CPU board or connected to the CPU board. The control device 110 also has a scanner IF 116 and a printer I/F 117 and is connected to the scan engine 130 and the printer CPU board 140 via the scanner I/F 116 and the printer I/F 117. The operating unit 120 is a local user interface (LUI) for operating the image forming apparatus 100 and receives predetermined instructions input by a user. The scan engine 130 has a scan unit 131 which optically scans an original and converts it into image data, and an ordinal feeding unit 132 which is capable of automatically replacing batches of originals in sequence. The scan engine 130 sends the image data obtained as a result of the conversion to the control device 110. The printer CPU board 140 has a CPU 141, which controls the entire printer CPU board 140, a memory 143 which is used as a work memory by the CPU 141, a nonvolatile memory 144, and an I/F 142 which is connected to the control device 110. The print engine 150 has a marking unit 151 for forming a toner image on a fed sheet, a sheet feeding unit 152 which successively feeds sheets one by one from a batch of sheets, and a sheet discharging unit 153 which discharges sheets after printing. The print engine 150 also has a fixing unit 154 which fixes a toner image formed on a sheet by the marking unit 151 with heat and pressure, and a fan 155 for cooling a sheet.

In the image forming apparatus 100, the power source 160 supplies power to the control device 110, the scan engine 130, the printer CPU board 140, and the print engine 150. It should be noted that broken lines in FIG. 2 indicate power supply lines. The power switch 161 is a hardware switch for controlling turning on and off of power supply. When the power switch 161 is turned on, the boot program in the boot ROM 114 is read into the memory 113 and sequentially executed by the CPU 111 to configure settings on the component elements and start an OS. When the execution of the boot program in the boot ROM 114 is completed, the CPU 111 executes controller programs (firmware) stored in the nonvolatile memory 115 so that various types of jobs can be received and executed.

Figure 3:
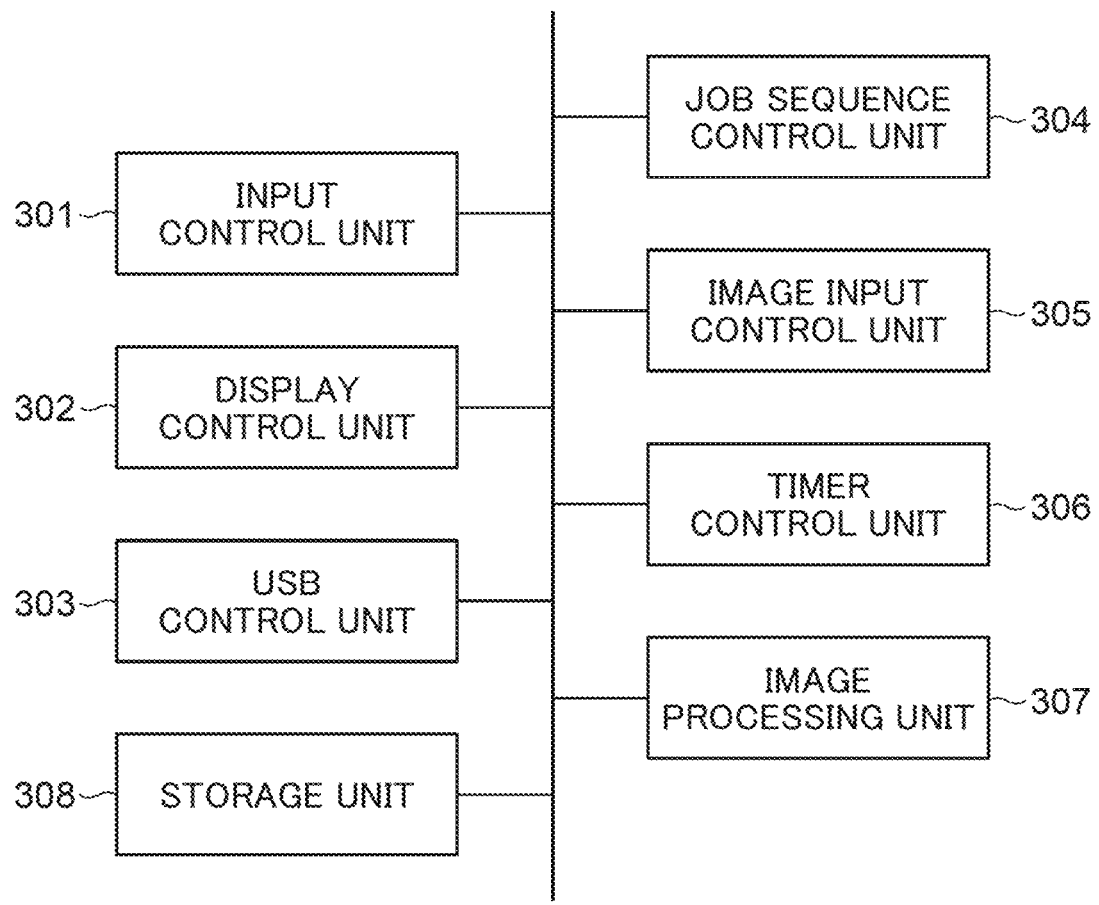
FIG. 3 is a diagram schematically showing a software module arrangement of the image forming apparatus in FIG. 1.

FIG. 3 is a diagram schematically showing a software module arrangement of the image forming apparatus 100 in FIG. 1. Functional units (modules) shown in FIG. 3 are implemented by the CPU 111 executing the boot program and the firmware. Referring to FIG. 3, the image forming apparatus 100 has modules such as an input control unit 301, a display control unit 302, a USB control unit 303, a job sequence control unit 304, an image input control unit 305, a timer control unit 306, an image processing unit 307, and a storage unit 308.

The input control unit 301 receives instructions input from the user via the operating unit 120 and notifies other modules of the received instructions. The display control unit 302 displays operating menus and instruction results on the operating unit 120 in accordance with instructions from the other modules. The USB control unit 303 controls the USB I/F 118 to input and output information such as files to and from the image forming apparatus 100 and the USB memory 101 in accordance with instructions from the other modules. The job sequence control unit 304 creates and processes jobs in response to notifications from the input control unit 301 and the USB control unit 303. The job sequence control unit 304 also gives instructions to the other modules at appropriate times to process a plurality of jobs in a predetermined sequence. Furthermore, when the power supply to the image forming apparatus 100 is turned on, the job sequence control unit 304 sends the other modules instructions to carry out a starting process. In response to an instruction to start image processing as a job from the job sequence control unit 304, the image input control unit 305 sets necessary parameters required for the image processing unit 307 to perform image processing and issues an instruction to start image processing. Particularly when the image processing is media printing, the image input control unit 305 reads a file from the USB memory 101 via the USB control unit 303 and requests the image processing unit 307 to process the read file. The timer control unit 306 receives requests from the other modules and provides timer-related control such as generation and discarding of a timer. The image processing unit 307 performs image processing such as calibration and color conversion on image data such as JPEG and page data interpreted by a module, not shown, which carries out a PDL process. The storage unit 308 writes designated data into the memory 113 and the nonvolatile memory 115 or reads stored data from them in accordance with an instruction from the other modules.

Figure 4:
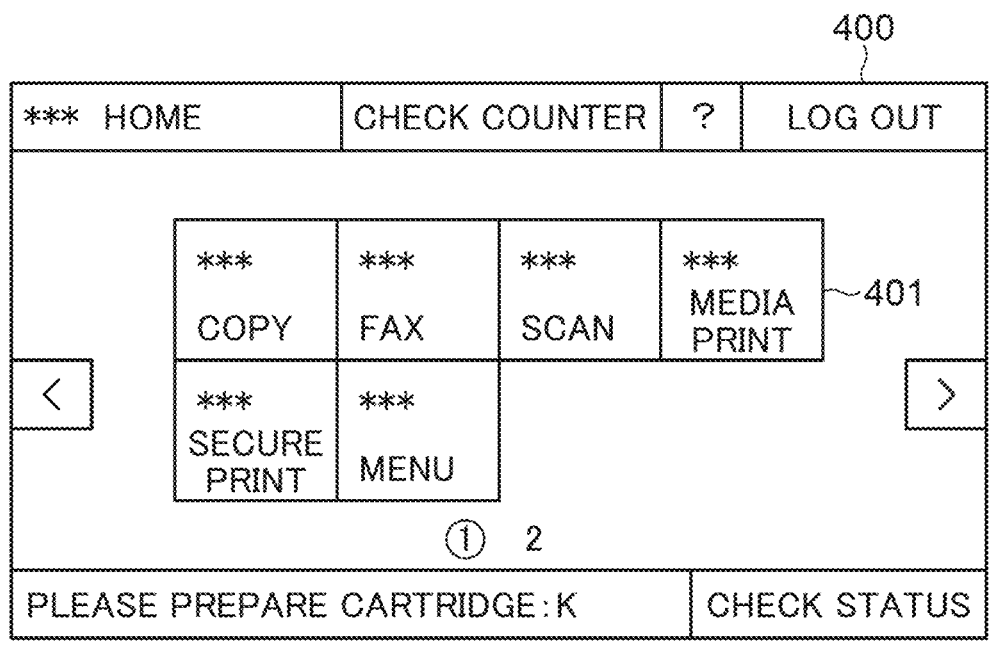
FIG. 4 is a view showing an example of a home screen which is displayed on an operating unit of the image forming apparatus in FIG. 1.

FIG. 4 is a view showing an example of a home screen which is displayed on the operating unit 120 of the image forming apparatus 100 in FIG. 1. Referring to FIG. 4, various buttons such as a media print button 401 corresponding to functions executable by the image forming apparatus 100 (copying, faxing, scanning, and media printing) are displayed on the home screen 400. The user is allowed to select one of these functions by depressing a given button. When the media print button 401 is depressed, a list of files and images stored in the USB memory 101 inserted into the slot of the image forming apparatus 100 are displayed on the operating unit 120. The user then selects a file to be stored, configures various print settings, and performs printing.

Figure 5:
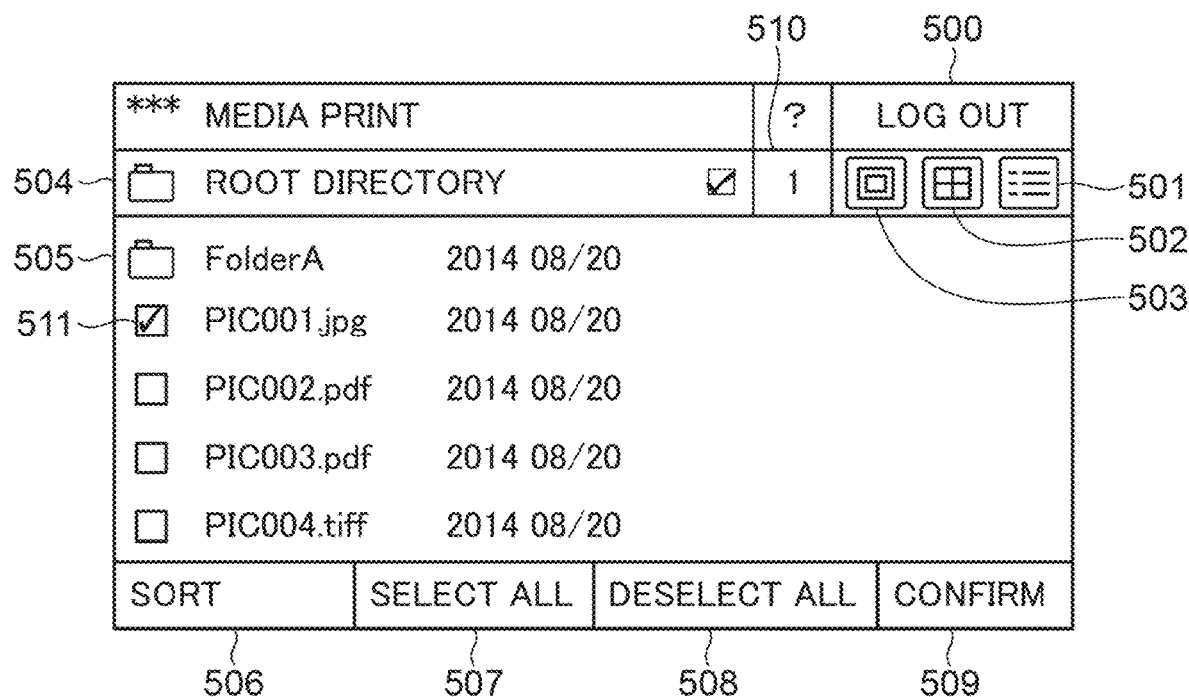
FIG. 5 is a view useful in explaining a list display screen which displays a list of files stored in a USB memory in FIG. 1.
Figure 6:
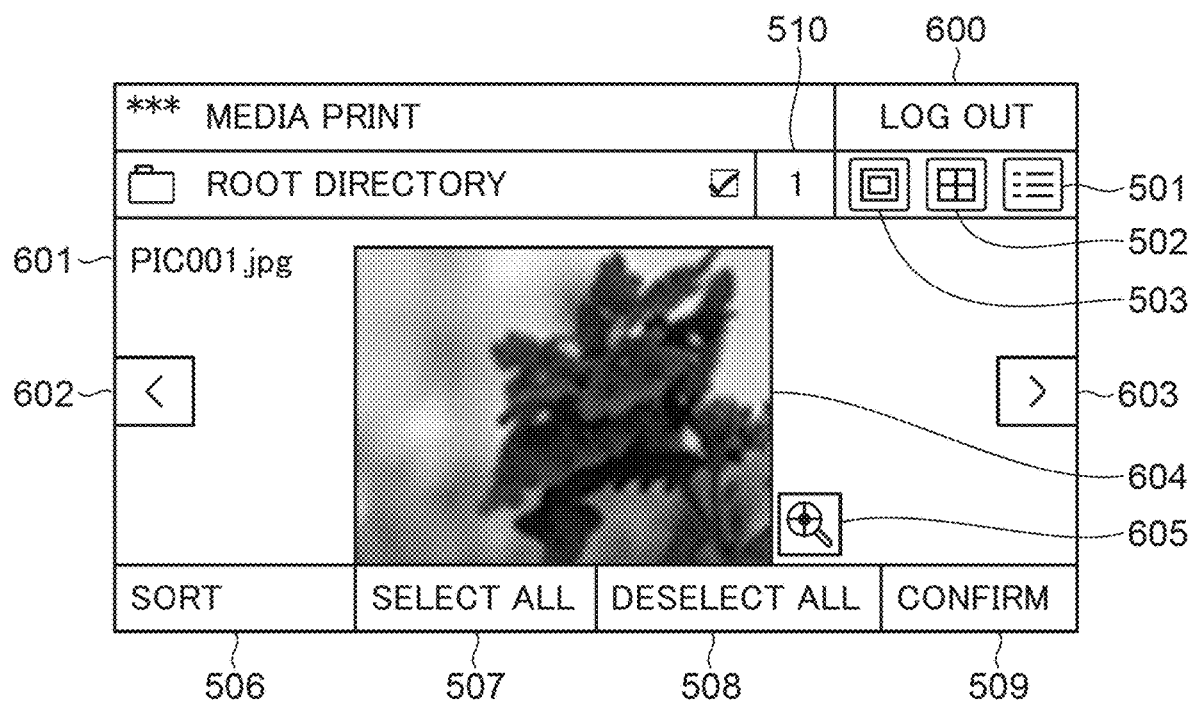
FIG. 6 is a view useful in explaining a preview screen which previews one image among files stored in the USB memory in FIG. 1.
Figure 7:
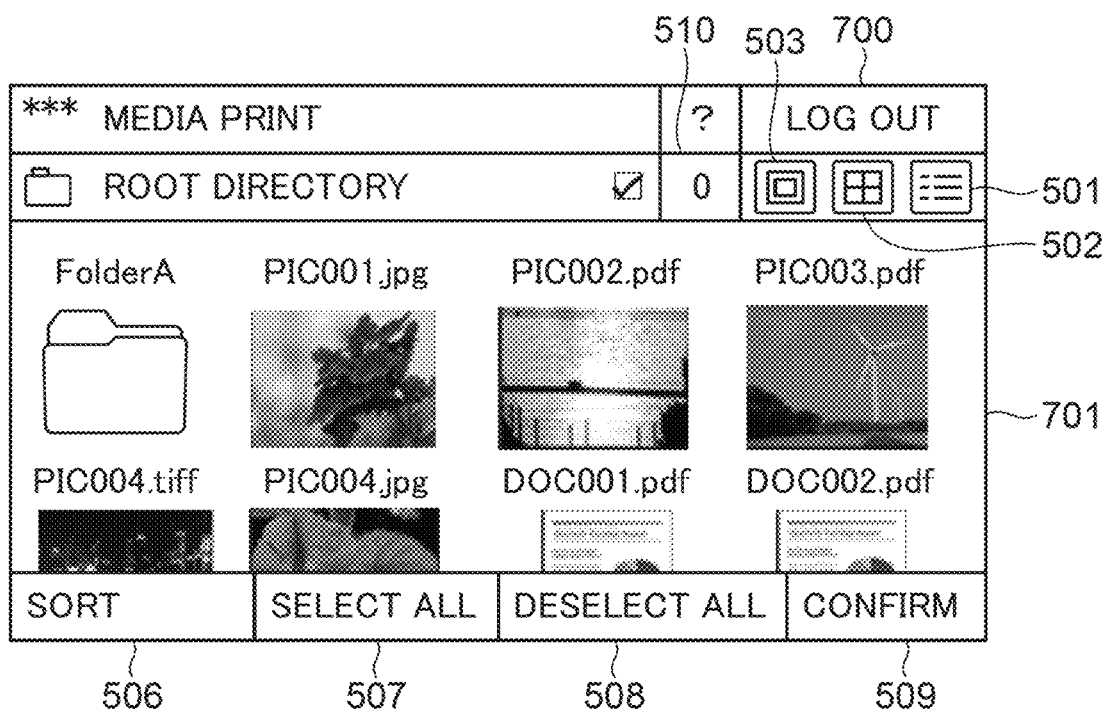
FIG. 7 is a view useful in explaining a thumbnail display screen which displays thumbnails in respective files stored in the USB memory in FIG. 1.

Referring to FIGS. 5 to 7, a description will now be given of operations performed to select a file after the media print button 401 is depressed on the home screen 400. FIGS. 5 to 7 are views showing screens for selecting a file, which are stored when the media print button is depressed on the home screen 400. FIG. 5 is a view useful in explaining a list display screen 500 which displays a list of files stored in the USB memory 101 in FIG. 1. FIG. 6 is a view useful in explaining a preview display screen 600 which previews one of images in files stored in the USB memory 101 in FIG. 1. FIG. 7 is a view useful in explaining a thumbnail display screen 700 which displays thumbnails in respective files stored in the USB memory 101 in FIG. 1. It should be noted that when the media print button 401 is depressed, one of the list display screen 500 in FIG. 5, the preview display screen 600 in FIG. 6, and the thumbnail display screen 700 in FIG. 7 is displayed. All of the list display screen 500, the preview display screen 600, and the thumbnail display screen 700 have display screen switching buttons 501 to 503. When the display screen switching button 501 is depressed, the list display screen 500 is displayed. When the display screen switching button 502 is depressed, the thumbnail display screen 700 is displayed. When the display screen switching button 503 is depressed, the preview display screen 600 is displayed.

On the list display screen 500, a list of files stored in the USB memory 101 is displayed. Particularly when the files are included in a folder, the list display screen 500 shows the files as file icons or file names in a file display field 505 and also shows a name of the folder including the files in a folder name display field 504. When the folder is in a top layer of a hierarchical structure or when the USB memory 101 has no folder hierarchy, information to this effect is displayed in the folder name display field 504. It should be noted in the example shown in FIG. 5, the USB memory 101 includes a "Folder A", which is represented as a folder icon in the file display field 505.

The list display screen 500 also has a sort button 506, a select all button 507, a deselect all button 508, and a confirmation button 509. When the user depresses the sort button 506, a menu (not shown) for changing an order in which the files names are displayed is displayed. When the user depresses the select all button 507, all the files displayed in the file display field 505 are selected. When the user taps a given file in the list display screen 500, the file is selected, and also, the deselect all button 508 and the confirmation button 509 are enabled. When a file is selected, the file is indicated by a checkmark 511, and the number of selected files is displayed in a number-of-selections display field 510. When the user depresses the deselect all button 508, all of selected files are deselected in a case where one or more files are selected. When the user depresses the confirmation button 509, a media print setting screen 800, to be described later, is displayed in a case where one or more files are selected. It should be noted that when the confirmation button 509 is depressed in a case where one or more files are selected, the selection of the files is confirmed.

On the preview display screen 600, one image 604 among the files stored in the USB memory 101 is previewed. A file name of a previewed image is displayed in a file name display field 601. A preview display screen 600 has a previous file display button 602 and a next file display button 603. When the user depresses the previous file display button 602, an image of a file previous to a currently previewed image of a file in the files stored in the USB memory 101 is previewed. When the user depresses the next file display button 603, an image of a file following the currently previewed image of the file in the files stored in the USB memory 101 is previewed. On the preview display screen 600, a file corresponding to the previewed image 604 is selected by tapping the previewed image 604. The preview display screen 600 also displays an enlarged preview button 605 under predetermined conditions. When the enlarged preview button 605 is depressed, an enlarged preview screen 900, to be described later, is displayed. It should be noted that the predetermined conditions will be described later with reference to FIG. 10.

Previewing images in respective files on the preview display screen 600 enables the user to see an image of a file desired to be printed prior to media printing. Previewing is useful particularly for users who want to see details of images in files when the images in the files cannot be recognized only by file names or when the images in the files are similar to one another. It should be noted that as with the list display screen 500, the preview display screen 600 has the sort button 506, the select all button 507, the deselect all button 508, and the confirmation button 509, and functions of these buttons are the same as those of the buttons on the list display screen 500.

On the thumbnail display screen 700, the files stored in the USB memory 101 are displayed as thumbnails in a thumbnail display field 701. When the user taps a desired thumbnail in the thumbnail display field 701, a file corresponding to the thumbnail is selected.

Since the files are displayed as the thumbnails on the thumbnail display screen 700, the user is able to roughly see an image of a desired file prior to media printing. Displaying thumbnails is useful for users who want to roughly grasp of files and users who want to quickly know details of files even when details of images in respective files are unknown in a case where a number of files are stored in the USB memory 101. It should be noted that as with the list display screen 500, the thumbnail display screen 700 also has the sort button 506, the select all button 507, the deselect all button 508, and the confirmation button 509, and functions of these buttons are the same as those of the buttons on the list display screen 500.

FIG. 8 is a view showing the media print setting screen which is displayed when the confirmation button 509 in FIGS. 5 to 7 is depressed. Referring to FIG. 8, the media print setting screen 800 has a number-of-selected files display field 801, a reset button 802, a monochrome start button 803, and a color start button 804. The media print setting screen 800 also has a sheet setting field 805, a brightness setting field 806, a number-of-copies setting field 807, a detailed setting field 808, a page aggregation setting field 809, a double-sided setting field 810, a preview field 811, and a status check button 812. The number-of-selected files display field 801 shows the number of files finally selected, and FIG. 8 shows a case where one file is finally selected. The sheet setting field 805 displays a sheet size and a sheet feeding cassette that are currently selected. By operating the sheet setting field 805 to change a sheet feeding cassette that is currently selected, the user selects a sheet feeding cassette in which a batch of sheets in a desired size is stored. The brightness setting field 806 displays an image brightness that is currently selected. By operating the brightness setting field 806, the user changes an image brightness that is currently set. The number-of-copies setting field 807 displays the number of copies that is currently set. By operating the number-of-copies setting field 807, the user changes the number of copies that is currently set. When the user depresses the detailed setting field 808, a detailed setting screen, not shown, is displayed, and detailed settings on an image processing function and the like are configured on the detailed setting screen. The page aggregation setting field 809 displays a page aggregation format. By operating the page aggregation setting field 809, the user sets an aggregation format such as 2 in 1. The double-sided setting field 810 displays a printing form that is currently set. By operating the double-sided setting field 810, the user selects one-sided printing or double-sided printing. When double-sided printing is selected, printing for opening to right/left or printing for opening to top is selectable. The preview field 811 does not preview a selected file but displays a sample of a print output in a case where a desired print form and a desired aggregation format have been set. FIG. 8 shows a sample screen in a case where one-sided printing is selected as a print form, and no page aggregation is selected as an aggregation format. When the user depresses the reset button 802, all the settings configured in the setting fields 805 to 810 are reset.

On the media print setting screen 800, the user configures desired settings in the setting fields 805 to 810 and then depresses the monochrome start button 803 to perform monochrome printing or depresses the color start button 804 to perform color printing. When the user depresses the status check button 812, a status check screen, not shown, is displayed so that the user can check a progress of a job or the like.

Figure 9:
FIG. 9 is a view showing an enlarged preview screen which is displayed when an enlarged preview button on the preview screen in FIG. 6 is depressed.

FIG. 9 is a view showing an enlarged preview screen 900 which is displayed when the enlarged preview button 605 on the preview display screen 600 in FIG. 6 is depressed. The enlarged preview screen 900 enlarges the image 604 previewed on the preview display screen 600 (changes a display form of an image). This enables the user to see details of an image that cannot be recognized only with the image 604 or a thumbnail on the thumbnail display screen 700.

It should be noted that the screens in FIGS. 4 to 8 described above are configured based on the assumption that they are touch panels, but they may be configured based on the assumption that they are user interfaces other than touch panels.

Figure 10:
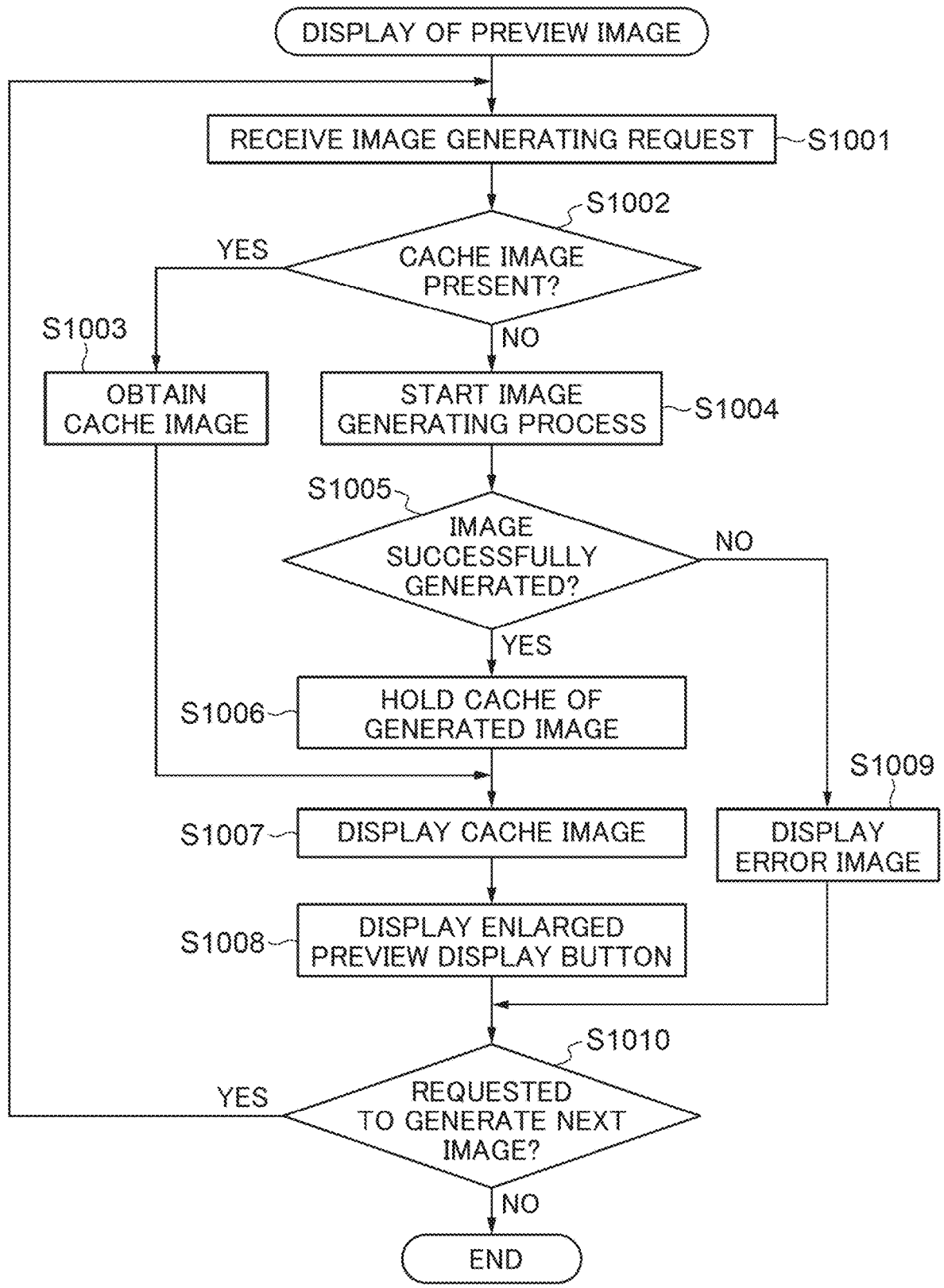
FIG. 10 is a flowchart showing a preview image display process which is an image forming method according to the first embodiment of the present invention.

A description will now be given of an image forming method according to the present embodiment (a control method for the image processing apparatus). FIG. 10 is a flowchart showing a preview image display process which is the image forming method according to the present embodiment. The process in FIG. 10 is implemented by the CPU 111 executing firmware stored in the nonvolatile memory 115 when the preview display screen 600 is displayed by depressing the media print button 401 on the home screen 400. It should be noted that the process in FIG. 10 is also carried out when the user has depressed the display screen switching button 503, the previous file display button 602, or the next file display button 603.

First, by depressing the media print button 401 on the home screen 400, the user inputs a request to display the preview display screen 600. At this time, the preview display screen 600 is displayed in response to the depression of the media print button 401. It should be noted that the list display screen 500 or the thumbnail display screen 700 may be displayed in response to the depression of the media print button 401. In the description of the present embodiment, however, it is assumed that the preview display screen 600 is set as a default screen to be displayed in response to the depression of the media print button 401. It should be noted that the default screen can be set by the user selecting a given screen on a setting screen, not shown.

At this time, the image input control unit 305 causes the input control unit 301, which has received the request to display the preview display screen 600, to receive a preview image generating request via the job sequence control unit 304 (S1001). It should be noted that a file targeted for the preview image generating request (hereafter referred to as a "designated file") is, for example, a file at the top of the list of the files stored in the USB memory 101. However, in a case where the process in FIG. 10 is carried out in response to depression of the display screen switching button 503, a file selected in the list display screen 500 or the thumbnail display screen 700 corresponds to the designated file. Moreover, in a case where the process in FIG. 10 is carried out in response to depression of the previous file display button 602, a file previous to an image that is currently previewed corresponds to the designated file. In a case where the process in FIG. 10 is carried out in response to depression of the next file display button 603, a file following an image that is currently previewed corresponds to the designated file.

Then, the image input control unit 305 judges whether or not a cache image of a designated file is present in the storage unit 308 via the USB control unit 303 (S1002). Here, the cache image is an image of the designated file to be previewed. When it is judged that the cache image is present (YES in S1002), the image input control unit 305 obtains the cache image from the storage unit 308 (S1003). Further, the image input control unit 305 passes the obtained cache image to the display control unit 302 via the job sequence control unit 304, and the display control unit 302 displays the cache image as the image 604 on the preview display screen 600 (S1007). Then, the display control unit 302 displays the enlarged preview button 605 at a predetermined position on the preview display screen 600 (S1008), followed by the process proceeding to step S1010. When it is judged that the cache image is not present (NO in S1002), the image input control unit 305 sets parameters or the like required to generate the cache image and requests the image processing unit 307 to generate the cache image. In response to this request, the image processing unit 307 starts a process to generate the cache image (S1004).

After that, the image input control unit 305 judges whether or not it has been notified by the image processing unit 307 that the cache image had successfully been generated (S1005). When the image input control unit 305 has been notified that the cache image had successfully been generated (YES in S1005), it holds the generated cache image in the storage unit 308 (S1006). At this time, when the number of cache images already held in the storage unit 308 has reached the maximum number of images that can be held (cached), the image input control unit 305 deletes the oldest cache image and holds the generated cache image in the storage unit 308. Then, the image input control unit 305 passes the generated cache image to the display control unit 302 via the job sequence control unit 304, and the display control unit 302 displays the cache image as the image 604 on the preview display screen 600 (S1007). After that, the display control unit 302 displays the enlarged preview button 605 at a predetermined position on the preview display screen 600 (S1008), followed by the process proceeding to S1010. When the image input control unit 305 has been notified that the cache image had not successfully been generated (NO in S1005), it passes an icon indicating a cause of the failure or an error image indicating the failure to the display control unit 302 via the job sequence control unit 304. Then, the display control unit 302 displays the icon or the error image on the preview display screen 600 (S1009), followed by the process proceeding to S1010. Namely, when the cache image is not successfully generated, the enlarged preview button 605 is not displayed on the preview display screen 600.

After that, it is judged whether or not a request to generate the next preview image has been issued by depressing the previous file display button 602 or the next file display button 603 (S1010). When no request to generate the next preview image has been made (NO in S1010), the process returns to S1001, and when the request to generate the next preview image has been made (YES in S1010), the present process is ended. It should be noted that when the home screen 400 is displayed again after the present process is ended, the cache images held in the storage unit 308 are cleared.

Figure 11:
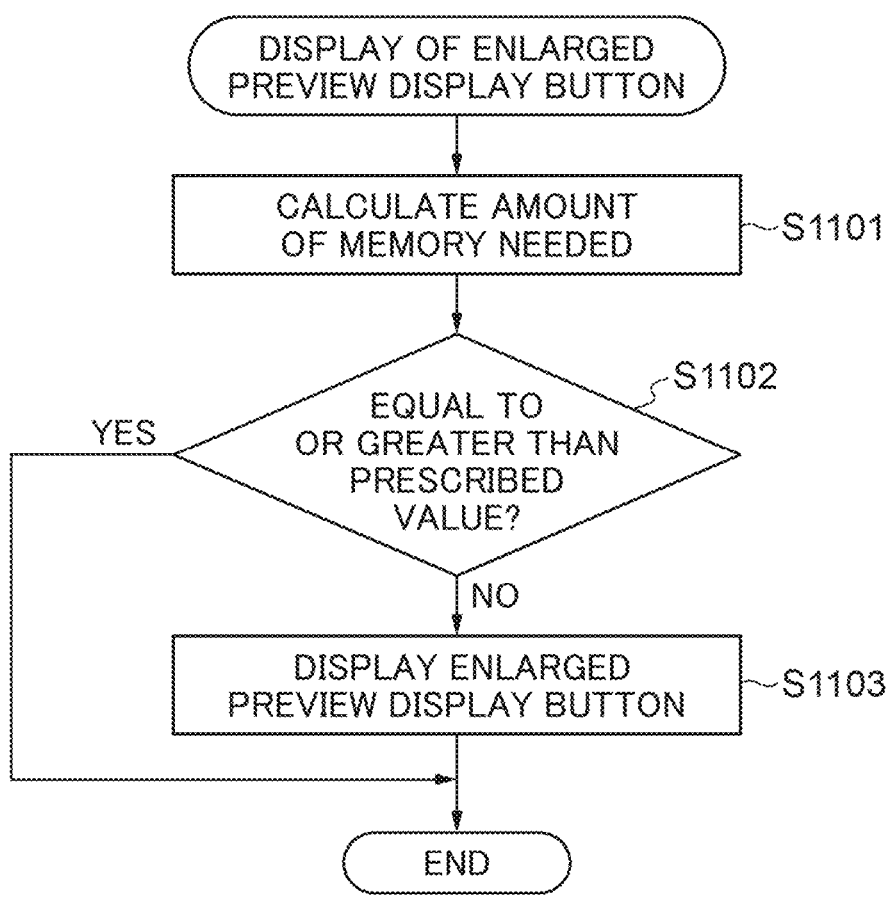
FIG. 11 is a flowchart showing an enlarged preview button display process which is carried out in step S1008 in FIG. 10.

FIG. 11 is a flowchart showing an enlarged preview button display process which is carried out in S1008 in FIG. 10. First, the image processing unit 307 calculates the amount of memory required for enlarged display based on a width, height, color depth, and component elements (image and characters) of a cache image (input image) and a width, height, and color depth of an enlarged image (output image) of the cache image (S1101). Next, the image input control unit 305 judges whether or not the amount of required memory calculated by the image processing unit 307 is equal to or greater than a prescribed value (S1102). When the amount of required memory is equal to or greater than the prescribed value (YES in S1102), the process proceeds to S1010 without the image input control unit 305 displaying the enlarged preview button 605. When the amount of required memory is smaller than the prescribed value (NO in S1102), the enlarge preview display button 605 is displayed (S1103), and the present process is ended, followed by the process proceeding to S1010.

According to the process in FIG. 10, when the cache image of the designated file has not successfully been generated, the enlarged preview button 605 is not displayed. In the first place, no cash image is previewed when a cash image has not successfully been generated, and it is thus impossible (difficult) to enlarge a previewed image. Therefore, not displaying the enlarged preview button 605 prevents an impossible enlarging process from being carried out. This prevents the user from unnecessarily waiting and thus prevents user convenience from decreasing.

Moreover, according to the process in FIG. 11, when memory required for enlarged display cannot be allocated, the enlarged preview button 605 is not displayed even in a case where an image can be previewed. When memory required for enlarged display cannot be allocated, the enlarging process is likely to be suspended at some point, and therefore, the enlarged preview button 605 is not displayed, which prevents the enlarging process likely to be suspended at some point from being carried out. This also prevents the user from unnecessarily waiting and thus prevents user convenience from decreasing.

A description will now be given of a second embodiment of the present invention. The second embodiment is basically the same as the first embodiment described above in terms of constructions and operations, and features of the construction and operation that are the same as those in the first embodiment will thus not be described, only features that are different from those of the first embodiment being described below. In the first embodiment, the enlarged preview button 605 is displayed after the presence of a cache image of a designated file is ascertained or after the cache image is generated. The second embodiment differs from the first embodiment in that the enlarged preview button 605 is displayed once before the presence of the cache image is ascertained or before the cache image is generated.

Figure 12:
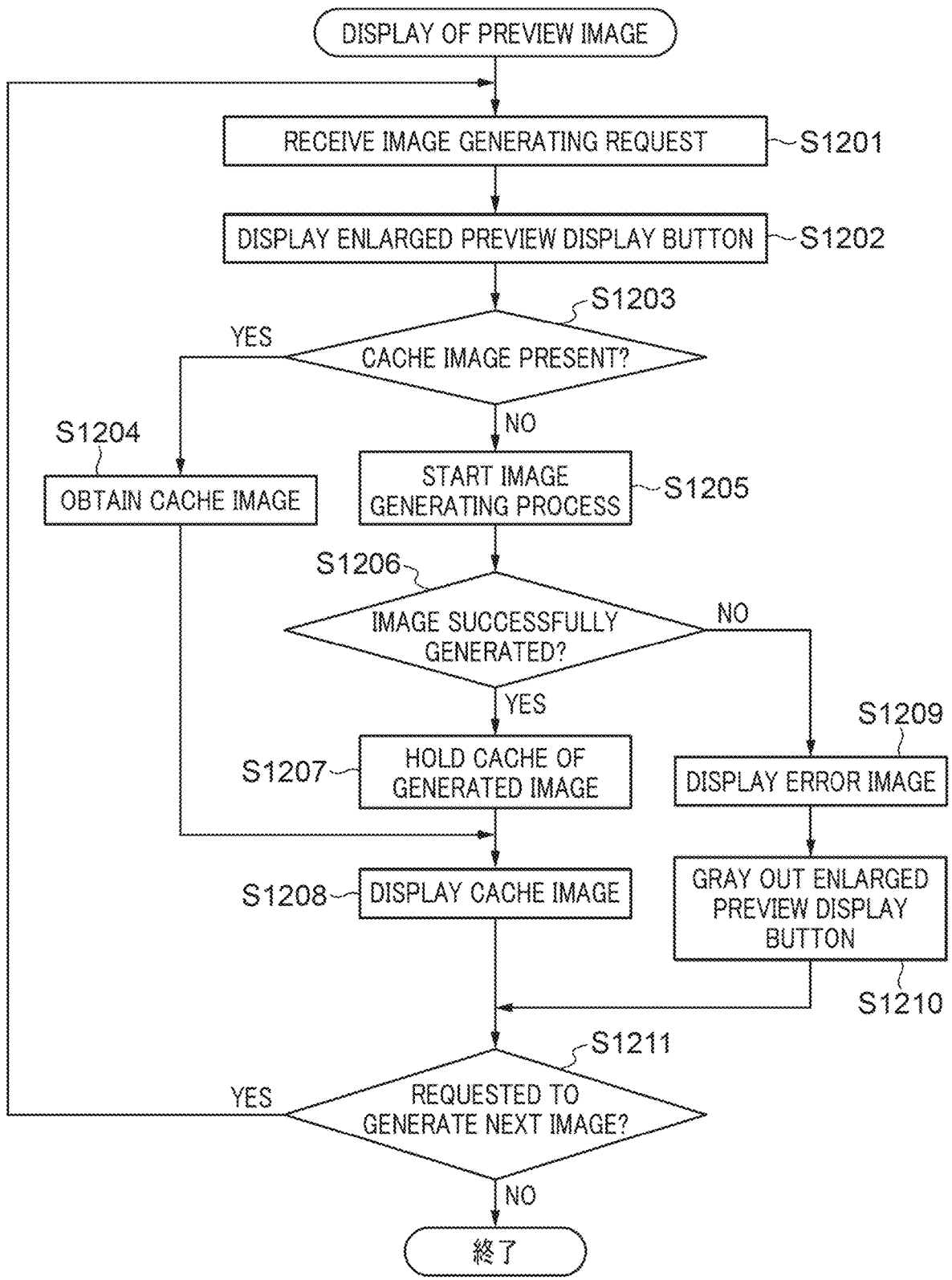
FIG. 12 is a flowchart showing a preview image display process which is an image forming method according to a second embodiment of the present invention.

FIG. 12 is a flowchart showing a preview image display process which is an image forming method according to the second embodiment of the present invention. The process in FIG. 12 is also implemented by the CPU 111 executing firmware stored in the nonvolatile memory 115 when the preview display screen 600 is displayed by depressing the media print button 401 on the home screen 400. It should be noted that as with the process in FIG. 10, the process in FIG. 12 is also carried out when the user has depressed the display screen switching button 503, the previous file display button 602, or the next file display button 603.

First, by depressing the media print button 401 on the home screen 400, the user inputs a request to display the preview display screen 600. At this time, the preview display screen 600 is displayed in response to the depression of the media print button 401. It should be noted that the list display screen 500 or the thumbnail display screen 700 may be displayed in response to the depression of the media print button 401. In the description of the present embodiment, however, it is assumed that the preview display screen 600 is set as a default screen to be displayed in response to the depression of the media print button 401. It should be noted that the default screen can be set by the user selecting a given screen on a setting screen, not shown.

At this time, the image input control unit 305 causes the input control unit 301, which has received the request to display the preview display screen 600, to receive a preview image generating request via the job sequence control unit 304 (S1201). Next, the display control unit 302 displays the enlarged preview button 605 at a predetermined position on the preview display screen 600 in a state where it is ready to receive an enlarging instruction (a state where input is possible) (S1202). Further, the image input control unit 305 judges whether or not a cache image of a designated file is present in the storage unit 308 via the USB control unit 303 (S1203). When it is judged that the cache image is present (YES in S1203), the image input control unit 305 obtains the cache image from the storage unit 308 (S1204). Further, the image input control unit 305 passes the obtained cache image to the display control unit 302 via the job sequence control unit 304, and the display control unit 302 displays the cache image as the image 604 on the preview display screen 600 (S1208). After that, the process proceeds to step S1211. When it is judged that the cache image is not present (NO in S1203), the image input control unit 305 sets parameters or the like required to generate the cache image and requests the image processing unit 307 to generate the cache image. In response to this request, the image processing unit 307 starts a process to generate the cache image (S1205).

After that, the image input control unit 305 judges whether or not it has been notified by the image processing unit 307 that the cache image had successfully been generated (S1206). When the image input control unit 305 has been notified that the cache image had successfully been generated (YES in S1206), it holds the generated cache image in the storage unit 308 (S1207). Then, the image input control unit 305 passes the generated cache image to the display control unit 302 via the job sequence control unit 304, and the display control unit 302 displays the cache image as the image 604 on the preview display screen 600 (S1208). After that, the process proceeds to S1211. When the image input control unit 305 has been notified that the cache image had not successfully been generated (NO in S1206), it passes an icon indicating a cause of the failure or an error image indicating the failure to the display control unit 302 via the job sequence control unit 304. Then, the display control unit 302 displays the icon or the error image on the preview display screen 600 (S1209). Further, the display control unit 302 displays the enlarged preview button 605 in, for example, a grayed-out manner so as to prevent an enlarging instruction from being received (i.e. in a state in which input is impossible) (S1210). Namely, when the cache image has not successfully been generated, the enlarged preview button 605 is displayed on the preview display screen 600 in the grayed-out manner so as to prevent an instruction from being received. The process then proceeds to S1211.

Then, it is judged whether or not a request to generate the next preview image has been made by depressing the previous file display button 602 or the next file display button 603 (S1211). When the request to generate the next preview image has been made (YES in S121), the process returns to S1201, and when is no request to generate the next preview image has been made (NO in S1211), the present process is ended. It should be noted that when the home screen 400 is displayed again after the present process is ended, the cache images held in the storage unit 308 are cleared.

According to the process in FIG. 12, when the cache image has not successfully been generated, the enlarged preview button 605 is displayed in the grayed-out manner so as to prevent an instruction from being received. In the first place, no cash image is previewed when a cash image has not successfully been generated, and it is thus impossible to enlarge a previewed image. Therefore, displaying the enlarged preview button 605 such that an instruction cannot be received prevents an impossible enlarging process from being carried out. This prevents the user from unnecessarily waiting and thus prevents user convenience from decreasing.

A description will now be given of a third embodiment of the present invention. The third embodiment is basically the same as the first embodiment described above in terms of constructions and operations, and features of the construction and operation that are the same as those in the first embodiment will thus not be described, only features that are different from those of the first embodiment being described below. As with the second embodiment, the third embodiment differs from the first embodiment in that the enlarged preview button 605 is displayed once before the presence of the cache image is ascertained or before the cache image is generated. The third embodiment also differs from the first embodiment in that even when a cache image of a designated file has not successfully been generated, the enlarged preview button 605 is not grayed out.

Figure 13:
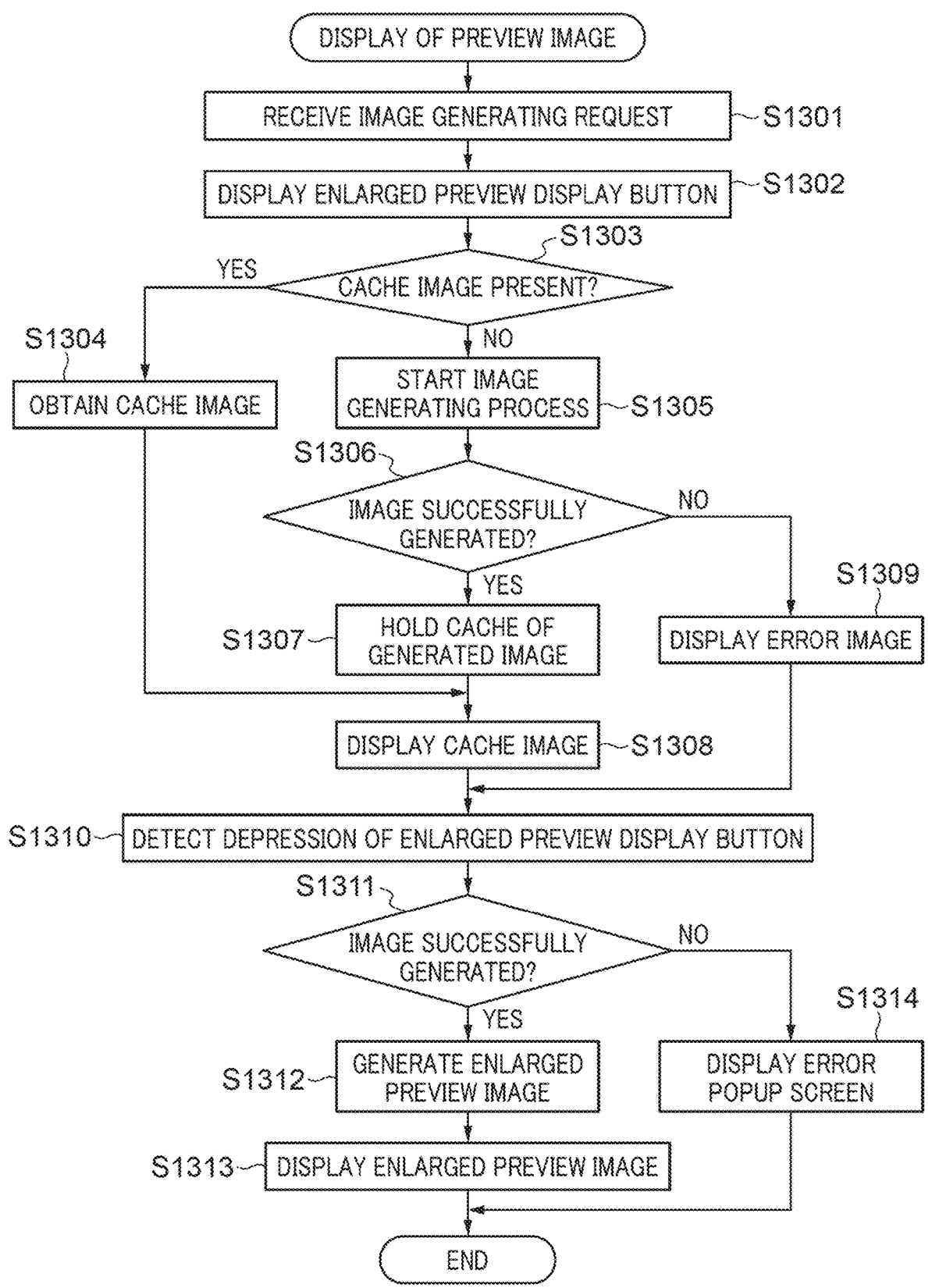
FIG. 13 is a flowchart showing a preview image display process which is an image forming method according to a third embodiment of the present invention.

FIG. 13 is a flowchart showing a preview image display process which is an image forming method according to the present embodiment. The process in FIG. 13 is also implemented by the CPU 1 executing firmware stored in the nonvolatile memory 115 when the preview display screen 600 is displayed by depressing the media print button 401 on the home screen 400. It should be noted that as with the process in FIG. 10, the process in FIG. 13 is also carried out when the user has depressed the display screen switching button 503, the previous file display button 602, or the next file display button 603.

First, by depressing the media print button 401 on the home screen 400, the user inputs a request to display the preview display screen 600. At this time, the preview display screen 600 is displayed in response to the depression of the media print button 401. It should be noted that the list display screen 500 or the thumbnail display screen 700 may be displayed in response to the depression of the media print button 401. In the description of the present embodiment, however, it is assumed that the preview display screen 600 is set as a default screen to be displayed in response to the depression of the media print button 401. It should be noted that the default screen can be set by the user selecting a given screen on a setting screen, not shown.

At this time, the image input control unit 305 causes the input control unit 301, which has received the request to display the preview display screen 600, to receive a preview image generating request via the job sequence control unit 304 (S1301). Next, the display control unit 302 displays the enlarged preview button 605 at a predetermined position on the preview display screen 600 in a state where it is ready to receive an enlarging instruction (a state where input is possible) (S1302). Further, the image input control unit 305 judges whether or not a cache image of a designated file is present in the storage unit 308 via the USB control unit 303 (S1303). When it is judged that the cache image is present (YES in S1303), the image input control unit 305 obtains the cache image from the storage unit 308 (S1304). Further, the image input control unit 305 passes the obtained cache image to the display control unit 302 via the job sequence control unit 304, and the display control unit 302 displays the cache image as the image 604 on the preview display screen 600 (S1308). After that, the process proceeds to step S1310. When it is judged that the cache image is not present (NO in S1303), the image input control unit 305 sets parameters or the like required to generate the cache image and requests the image processing unit 307 to generate the cache image. In response to this request, the image processing unit 307 starts a process to generate the cache image (S1305).

After that, the image input control unit 305 judges whether or not it has been notified by the image processing unit 307 that the cache image had successfully been generated (S1306). When the image input control unit 305 has been notified that the cache image had successfully been generated (YES in S1306), it holds the generated cache image in the storage unit 308 (S1307). Then, the image input control unit 305 passes the generated cache image to the display control unit 302 via the job sequence control unit 304, and the display control unit 302 displays the cache image as the image 604 on the preview display screen 600 (S1308). After that, the process proceeds to S1311. When the image input control unit 305 has been notified that the cache image had not successfully been generated (NO in S1306), it passes an icon indicating a cause of the failure or an error image indicating the failure to the display control unit 302 via the job sequence control unit 304. Then, the display control unit 302 displays the icon or the error image on the preview display screen 600 (S1309), followed by the process proceeding to S1310.

Figure 14:
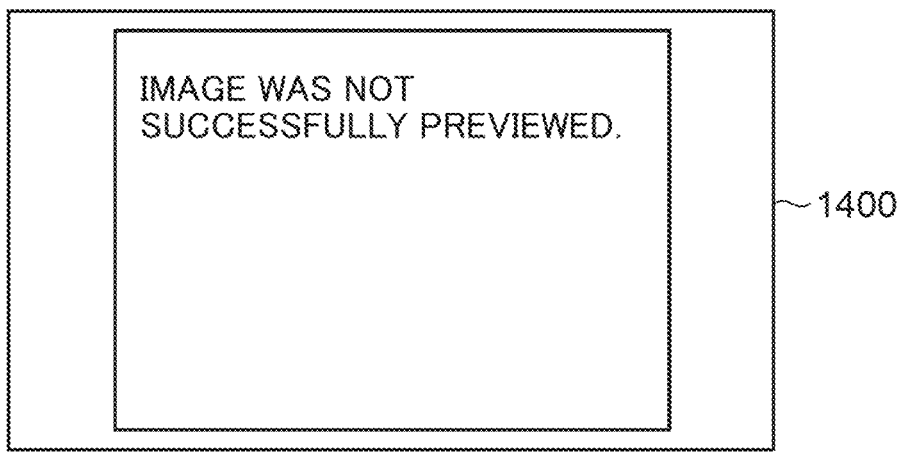
FIG. 14 is a view showing an error popup screen which is displayed on the operating unit in step S1314 in FIG. 13.

After that, when the input control unit 301 detects depression of the enlarged preview button 605 by the user (S1310), the image input control unit 305 judges in S1306 whether or not it has been notified by the image processing unit 307 that the cache image had successfully been generated (S1311). When the image input control unit 305 has been notified that the cache image had successfully been generated (YES in S1311), the image input control unit 305 sets parameters or the like required to enlarge the previewed image. The image input control unit 305 requests the image processing unit 307 to generate a preview image that has been enlarged (hereafter referred to as "the enlarged preview image"). In response to this request, the image processing unit 307 starts a process to generate the enlarged preview image (S1312). Then, the image input control unit 305 passes the generated enlarged preview image to the display control unit 302 via the job sequence control unit 304. After that, the display control unit 302 opens the enlarged preview screen 900 to display the enlarged preview image on the enlarged preview screen 900 (S1313) and ends the present process. When the image input control unit 305 has been notified that the cache image had not successfully been generated (NO in S1311), the display control unit 302 displays an error popup screen 1400 (FIG. 14) (S1314), followed by the present process being ended. It should be noted that when the home screen 400 is displayed again after the present process is ended, the cache images held in the storage unit 308 are cleared.

According to the process in FIG. 13, when the cache image has not successfully been generated, the error popup screen 1400 is displayed without carrying out the process to generate the enlarged preview image even if the enlarged preview button 605 is depressed. In the first place, no cash image is previewed when a cash image has not successfully been generated, and it is thus impossible to enlarge a previewed image. Therefore, not carrying out the process to generate the enlarged preview image even if the enlarged preview button 605 is depressed prevents an impossible enlarging process from being carried out. This prevents the user from unnecessarily waiting and thus prevents user convenience from decreasing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004348, filed Jan. 15, 2018, which is hereby incorporated by reference herein in its entirety.

What is claimed is:

1. An image forming apparatus configured to form an image on a sheet, comprising:
a display device configured to display information; and
one or more processors connected to memory, the one or more processors being configured to:
cause the display device to display a first screen for previewing one file among a plurality of accessible files;
acquire a first preview image based on the basis of a predetermined page of the one file;
arrange the first preview image on an image area in the first screen and an instruction object, separate from the image, on the first screen in a case where the acquisition of the first preview image is successful, wherein an error image is arranged on the image area in the first screen in place of the first preview image and the instruction object is not arranged in the first screen in a case where the acquisition of the first preview image has failed;
acquire, based on designation of the instruction object, a second preview image on the basis of the predetermined page of the one file, wherein a data size of the second preview image is larger than that of the first preview image; and
cause the display device, in a case where the acquisition of the second preview image is successful, to display a second screen on which the second preview image is arranged, wherein the second preview image arranged on the second screen is larger than the first preview image arranged on the image area.

2. The image forming apparatus according to claim 1, wherein in a state that the acquisition of the first preview image has not succeeded, a grayed-out object is arranged on the first screen instead of the instruction object.

3. The image forming apparatus according to claim 1, wherein the first screen permits reception of the instruction for acquiring the second preview image after acquiring a judgment result indicating that it is possible to complete acquisition of the second preview image.

4. The image forming apparatus according to claim 3, wherein the judgment result is acquired according to a calculation result of an amount of memory required for acquiring the second preview image.

5. The image forming apparatus according to claim 1, wherein predetermined information is arranged on the first screen based on failure of the acquisition of the first preview image.

6. The image forming apparatus according to claim 5, wherein the predetermined information notifies a user of a cause of failure of acquisition of the first preview image.

7. The image forming apparatus according to claim 1, wherein a resolution of the second preview image is higher than that of the first preview image.

8. The image forming apparatus according to claim 1, wherein the one or more processors are configured to, in response to completion of acquisition of the second preview image, cause the display device to display second screen on which the second preview image is placed.

9. The image forming apparatus according to claim 8, wherein the first screen includes thereon an instruction object area on which a plurality of instruction objects are placed, and wherein the second screen does not include thereon the instruction area.

10. The image forming apparatus according to claim 1, wherein the one file is obtained from a removable medium.

11. The image forming apparatus according to claim 1, further comprising a printing device configured to perform printing based on the one file.

12. The image forming apparatus according to claim 1, wherein the one file is a PDF file.

13. A control method for an image forming apparatus configured to form an image on a sheet, the image forming apparatus comprising a display device, a memory storing a program and a controller executing the program to:
cause the display device to display a first screen for one file among a plurality of accessible files;
acquire a first preview image on the basis of a predetermined page of the one file;
arrange the first preview image on an image area in the first screen and an instruction object, separate from the image, on the first screen in a case where acquisition of the first preview image is successful, wherein an error image is arranged on the image area in the first screen in place of the first preview image and the instruction object is not arranged in the first screen in a case where the acquisition of the first preview image has failed;
acquire, based on designation of the instruction object, a second preview image on the basis of the predetermined page of the one file, wherein a data size of the second preview image is larger than that of the first preview image; and
cause the display device, in a case where the acquisition of the second preview image is successful, to display a second screen on which the second preview image is arranged, wherein the second preview image arranged on the second screen is larger than the first preview image arranged on the image area.

14. A non-transitory computer-readable storage medium storing a program for causing a computer to execute a control method for an image forming apparatus configured to form an image on a sheet, that is capable of acquiring preview images based on one file among a plurality of accessible files, the image forming apparatus comprising a display device, a memory storing another program and a controller executing the other program to:
cause the display device to display a first screen for one file among a plurality of accessible files;
acquire a first preview image on the basis of a predetermined page of the one file;
arrange the first preview image on an image area in the first screen and an instruction object, separate from the image, on the first screen in a case where the acquisition of the first preview image is successful, wherein an error image is arranged on the image area in the first screen in place of the first preview image and the instruction object is not arranged in the first screen in a case where the acquisition of the first preview image has failed;
acquire, based on designation of the instruction object, a second preview image on the basis of the predetermined page of the one file, wherein a data size of the second preview image is larger than that of the first preview image; and
cause the display device, in a case where the acquisition of the first preview image is successful, to display a second screen on which the second preview image is arranged, wherein the second preview image arranged on the second screen is larger than the first preview image arranged on the image area.

15. An image forming apparatus configured to form an image on a sheet, comprising:
a display device configured to display information; and
one or more processors connected to memory, the one or more processors being configured to:
cause the display device to display a first screen for one file among a plurality of accessible files;
acquire a first preview image based on the basis of a predetermined page of the one file;
arrange the first preview image on an image area in the first screen and an instruction object, separate from the image, on the first screen in a case where upon condition that the acquisition of the first preview image is successful, wherein an error image is arranged on the image area in the first screen in place of the first preview image and the instruction object is grayed-out in a case where the acquisition of the first preview image has failed;
acquire, based on designation of the instruction object, a second preview image on the basis of the predetermined page of the one file, wherein a data size of the second preview image is larger than that of the first preview image; and
cause the display device, in a case where the acquisition of the second preview image is successful, to display a second screen on which the second preview image is arranged, wherein the second preview image arranged on the second screen is larger than the first preview image arranged on the image area.

* * * * *